United States Patent Office 2,706,730
Patented Apr. 19, 1955

2,706,730

SYNTHESIS OF 2-METHYL-5-ETHYLPYRIDINE FROM ALKYL VINYL ETHERS AND AMMONIA

John E. Mahan, Bartlesville, Okla., assignor to Phillips Petroleum Company, a corporation of Delaware No Drawing. Application January 7, 1952, Serial No. 265,357

10 Claims. (Cl. 260—290)

This invention relates to the synthesis of pyridine derivatives from alkenyl alkyl ethers and ammonia. In one of its preferred embodiments the invention pertains to the formation of 2-methyl-5-ethylpyridine (aldehyde collidine) by reaction of methyl vinyl ether with ammonia.

Methyl vinyl ether has heretofore been reacted with ammonia in an anhydrous system to give pyridine bases, including 2-methyl-5-ethylpyridine. To the best of my knowledge, it has never been suggested that this reaction might be effected in an aqueous system. Further, in the anhydrous system the catalysts previously suggested vary greatly in their ability to catalyze the reaction.

It is an object of this invention to form pyridine derivatives by reaction of alkenyl alkyl ethers with ammonia. Another object is to react ammonia with methyl vinyl ether to form 2-methyl-5-ethylpyridine. A further object is to provide catalysts for these reactions. Yet another object is to effect said reactions in an aqueous reaction mixture. Another object is to effect said reactions in an anhydrous system. Other objects and advantages of the invention will be apparent, to one skilled in the art, from the accompanying disclosure and discussion.

In accordance with my invention in preferred aspects, one or more of the foregoing objects are attained by reacting ammonia with an alkenyl alkyl ether having the formula

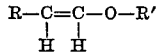

wherein R is hydrogen, methyl, ethyl or phenyl and R' is methyl, ethyl or propyl, in the presence of certain fluorine-containing catalysts described in more detail hereinbelow. Where R is H, 2-methyl-5-ethylpyridine is made in large amounts, as well as some picolines and higher boiling pyridine bases. Where R is other than H, pyridines of molecular weight higher than 2-methyl-5-ethylpyridine are largely produced. The reaction can be effected in the absence of water. However, it is a feature of this invention that the reaction goes well with aqueous ammonia in the presence of my catalysts.

Methyl vinyl ether is the preferred reactant. Others include, for example, ethyl vinyl ether, propyl vinyl ether, isopropyl vinyl ether, methyl propenyl-1 ether, ethyl butenyl-1 ether, methyl beta-phenylvinyl ether ($C_6H_5$—CH=CH—O—$CH_3$).

In my invention I employ fluorine-containing catalysts for the condensation of ammonia with the stated alkenyl alkyl ethers to make pyridine derivatives. Those fluorine-containing compounds which are catalysts for said condensation are believed to operate by liberation of hydrogen fluoride, by hydrolysis or otherwise, before or during the reaction, i. e. at the reaction conditions. However, I do not desire to be limited unduly by a particular theory of operation. Among the preferred catalysts can be named by way of example, hydrogen fluoride added as such; ammonium fluoride ($NH_4F$); ammonium bifluoride ($NH_4F \cdot HF$); alkali metal bifluorides especially sodium bifluoride and potassium bifluoride; zinc fluoride; iron fluoride especially ferric fluoride; the fluorides and bifluorides of the other metals of groups II to VIII of the periodic system, e. g. aluminum fluoride, titanium fluoride, tungsten fluoride, zirconium fluoride, vanadium fluoride, antimony fluoride, uranium fluoride, nickel fluoride; boron trifluoride; complexes of boron trifluoride especially complexes of boron trifluoride with water, ammonia, amines, organic acids, phosphoric acid, alcohols, ethers; the following acids added as such or as any of the salts thereof, especially the ammonium, metallic, and amine salts thereof: fluoboric acid, the fluorophosphoric acids, fluosilicic acid, fluosulfonic acid, trifluoracetic acid and other fluorine-containing organic acids especially the perfluoro aliphatic acids (in which all hydrogens attached to carbon atoms have been replaced by fluorine), e. g. heptafluorobutyric acid; quaternary ammonium fluorides, for example trimethylbenzyl ammonium fluoride; sulfur fluorides; chlorine trifluoride; the various oxygen fluorides; phosphorus fluoride (tri and penta).

I find it preferable to employ these catalysts in relatively small amounts. Usually from 0.2 to 10.0, preferably from 1.5 to 5.0, weight per cent of catalyst based on the alkenyl alkyl ether is employed.

I much prefer to employ in the reaction mixture an excess of ammonia over the stoichiometric amount for the reaction. The stoichiometric mol ratio of ammonia to methyl vinyl ether for the formation of 2-methyl-5-ethylpyridine is 0.25:1. The mol ratios used are ordinarily within the range of 0.25:1 to 4:1, and are preferably within the range of 0.4:1 to 3.0:1.

The reaction can be effected at 200 to 700° F., but I prefer that it be carried out at 400 to 600° F.

For best results, sufficient pressure ought to be used to maintain the reaction mixture at least partly in liquid phase. Obviously this pressure will vary numerically with the temperature, the ammonia content of the reaction mixture, and other factors understood by those skilled in the art. By way of example, the aqueous systems may operate at pressures of 750 to 2,500 pounds per square inch gage, whereas the anhydrous systems will operate at higher pressures, for instance 2,000 to 4,000 p. s. i. g. My use of aqueous systems permits considerably lowered pressure, which is a distinct advantage in commercial operations.

A suitable reaction time will vary considerably with the different variables of the reaction, and will also be affected by choice of continuous flow or batch operation. In general the reaction time can be said to be from 0.25 to 24 hours, with a preferred range of 1 to 10 hours. In the examples below it will be seen that in one specific instance a time of 3 hours was not as satisfactory as 6 hours for a batch reaction.

Unless an anhydrous reaction mixture is to be used, ammonia and water are preferably supplied to the reaction in a ratio such that a water-ammonia solution containing 10 to 90 weight per cent ammonia is formed. I usually prefer that the aqueous ammonia, calculated on the basis of ammonia and water only, be from 20 to 60 weight per cent ammonia.

I often employ as a component of the reaction mixture a small quantity of a phosphate glass of an alkali metal or alkaline earth metal, or a pyrophosphate of ammonia or alkali metal or alkaline earth metal, as additional catalyst for the reaction, synergist for the fluorine-containing catalyst, and/or corrosion inhibitor. These phosphates also often aid in working up the products by reducing emulsion formation. The amount employed is preferably from 0.05 to 10, and more preferably from 0.1 to 6, weight per cent based on the alkenyl alkyl ether charged. Calcium phosphate glasses can be used, but I usually employ water soluble alkali metal phosphate glasses, and prefer to use a water soluble sodium phosphate glass. Descriptions of these glasses and the methods of producing them are contained in the articles by Partridge, Chemical and Engineering News 27, 214–217 (1949) and by Schwartz et al., Industrial and Engineering Chemistry 34, 32–40 (1942). The metal phosphate glasses and particularly the sodium phosphate glasses, are readily prepared by heating the corresponding metal metaphosphate to a temperature above its melting point and rapidly cooling the resulting liquid to form a vitreous or glassy product. The glasses contain $P_2O_5$ and metallic oxides in varying amounts, and the ratio of $P_2O_5$ and metallic oxides extends over a wide range. More specifically, the glasses I employ can contain a minor, say 0.1 mol per cent, amount of metallic oxide, and the concentration of the metallic oxide may vary up to 60 mol per cent. The preferred glass is available commercially, and it is known as sodium hexametaphosphate. This preferred glass contains equimolar proportions of $Na_2O$ and $P_2O_5$.

EXAMPLES

The following data are presented as illustrative of certain preferred aspects of my invention, employing an aqueous reaction mixture.

*Synthesis of 2-methyl-5-ethylpyridine from methyl vinyl ether and aqueous ammonia*

| Run No. | 1 a | 2 | 3 | 4 | 5 |
|---|---|---|---|---|---|
| Temp., °F. | 500 | 500 | 500 | 500 | 500 |
| Duration, hrs. b | 3 | 6 | 6 | 6 | 6 |
| Catalyst c | $NH_4HF_2$-Sodium hexametaphosphate. | $NH_4HF_2$-Sodium hexametaphosphate. | Sodium hexametaphosphate | $NH_4HF_2$ | None |
| Charge data: | | | | | |
| Catalyst, grams | 3 | 3 | 1 | 2 | ---------- |
| Water, grams | 211 | 211 | 211 | 211 | 211 |
| MVE, grams | 213 | 220 | 223 | 236 | 224 |
| MVE, mols | 3.67 | 3.79 | 3.84 | 4.07 | 3.86 |
| $NH_3$, grams | 173 | 173 | 173 | 173 | 173 |
| $NH_3$, mols | 10.18 | 10.18 | 10.18 | 10.18 | 10.18 |
| $NH_3$/MVE mol ratio | 2.77 | 2.69 | 2.65 | 2.50 | 2.64 |
| Yields, mol percent d: | | | | | |
| Picolines | 2.7 | 2.2 | 4.8 | 3.7 | 6.5 |
| 2M5EP | 56.9 | 69.9 | 50.6 | 71.5 | 38.5 |
| Higher pyridines | 20.5 | 26.2 | 40.5 | 25.4 | 49.0 |
| Total | 80.1 | 98.3 | 95.9 | 100.6 | 94.0 | a A small amount of material was lost during transfer of the reaction mixture from bomb to separatory funnel for this run. A maximum pressure of 2,300 p. s. i. g. was recorded for run No. 1.

b The reaction times shown do not include the period from 60 to 80 minutes required to bring the mixture up to reaction temperature.

c The catalyst charge weight for runs 1 and 2 consisted of 2 grams of $NH_4HF_2$ and 1 gram of sodium hexametaphosphate.

d The mol percent yields shown are based on methyl vinyl ether charged. The higher boiling pyridines (pot residue and holdup) were assumed to have a molecular weight of 147 for purposes of calculation.

While the invention has been described in detail with respect to some of its preferred aspects, it will be apparent that many modifications in the details given can be made without departing from the invention.

I claim:

1. In the formation of 2-methyl-5-ethylpyridine by reaction of ammonia with an alkenyl alkyl ether selected from the group consisting of methyl vinyl ether, ethyl vinyl ether, propyl vinyl ether and isopropyl vinyl ether, the improvement which comprises effecting said reaction in the presence of a fluorine-containing compound which liberates hydrogen fluoride before or during the reaction.

2. A process for making 2-methyl-5-ethylpyridine which comprises reacting ammonia with methyl vinyl ether in the presence of ammonium bifluoride as catalyst.

3. A process for making 2-methyl-5-ethylpyridine which comprises reacting aqueous ammonia with methyl vinyl ether in the presence of ammonium bifluoride as catalyst.

4. In the formation of 2-methyl-5-ethylpyridine by reaction of ammonia with methyl vinyl ether, the improvement which comprises effecting said reaction in the presence of a fluorine-containing compound which liberates hydrogen fluoride before or during the reaction.

5. The process of claim 4 wherein water is present in the reaction mixture.

6. A process for making 2-methyl-5-ethylpyridine which comprises reacting ammonia with methyl vinyl ether in the presence of hydrogen fluoride as catalyst.

7. A process for making 2-methyl-5-ethylpyridine which comprises reacting ammonia with methyl vinyl ether in the presence of ammonium fluoride as catalyst.

8. A process for making 2-methyl-5-ethylpyridine which comprises reacting ammonia with methyl vinyl ether in the presence of boron trifluoride as catalyst.

9. A process for making 2-methyl-5-ethylpyridine which comprises reacting ammonia with methyl vinyl ether in the presence of an alkali metal bifluoride as catalyst.

10. A process for making 2-methyl-5-ethylpyridine which comprises reacting a stoichiometric excess of ammonia with methyl vinyl ether at 400 to 600° F. at sufficient pressure to maintain a liquid phase for a time of 1 to 10 hours in the presence of from 0.2 to 10 weight per cent ammonium bifluoride based on the methyl vinyl ether.

References Cited in the file of this patent

FOREIGN PATENTS 893,375   France _____ June 7, 1944

OTHER REFERENCES

Krzikallla et al.: (Ger.) P. B. Report No. 602 (1941).
Woldan: (Ger.) P. B. Report No. 665 (1943).